US008788384B2

(12) United States Patent
Hebner et al.

(10) Patent No.: US 8,788,384 B2
(45) Date of Patent: Jul. 22, 2014

(54) COMPENSATION BASED ON ENTITY GROUPS

(75) Inventors: Allyn P. Hebner, Sammamish, WA (US); Robert A. McFadden, Prosper, TX (US); Ryan K. Wuerch, Medina, WA (US); James P. Ryan, Bellevue, WA (US)

(73) Assignee: Solavei, LLC, Bellevue, WA (US)

( * ) Notice: Subject to any disclaimer, the term of this patent is extended or adjusted under 35 U.S.C. 154(b) by 0 days.

(21) Appl. No.: 13/452,479

(22) Filed: Apr. 20, 2012

(65) Prior Publication Data

US 2013/0282543 A1  Oct. 24, 2013

(51) Int. Cl.
*G06Q 40/00* (2012.01)

(52) U.S. Cl.
USPC .......................................................... 705/35

(58) Field of Classification Search
USPC ..................................... 705/35–45
See application file for complete search history.

(56) References Cited

U.S. PATENT DOCUMENTS 8,412,629 B2 * 4/2013 Masi ............................... 705/41
2010/0076830 A1 * 3/2010 Huhem et al. ............. 705/14.16

FOREIGN PATENT DOCUMENTS

JP                  323799        *   1/2006

* cited by examiner

*Primary Examiner* — Richard C Weisberger
(74) *Attorney, Agent, or Firm* — Lee & Hayes, PLLC

(57) ABSTRACT

Various implementations for providing compensation based at least in part on a number of entity groups are described. A relationship network associated with an entity includes a plurality of network entities. The relationship network is determined, and a number of entity groups within the relationship network are counted. The entity groups have a predetermined number of network entities. An entity is caused to be provided with compensation that is based at least in part on the number of entity groups in the relationship network.

19 Claims, 8 Drawing Sheets

COMPENSATION BASED ON ENTITY GROUPS

RELATED APPLICATIONS

The present application is related to U.S. application Ser. No. 13/421,616 filed on Mar. 15, 2012, and entitled "Mobile Service Distribution and Provisioning Architecture," the entire contents of which are hereby incorporated herein by reference in their entirety for all purposes.

BACKGROUND

Conventional direct sales models pay commissions based on a percentage of the purchases made by individuals within a member's network. The more products sold within a member's network, the higher the commissions paid to the member. A member's network grows when the member adds direct recruits to the network. Also, the member's network grows when other members within his or her network recruit new members.

A conventional direct sales network therefore has multiple levels. Recruits of recruits are two levels away from the member. Individuals recruited by members two levels away are three levels away from the member, and so forth. Because purchases made anywhere within the network drive additional commissions for the member, members have an incentive to help their recruits sell product and to help their recruits recruit new individuals into the network. But in order to maintain the sustainability of a conventional direct sales model, the member is paid a lower percentage of the purchases made at levels far away from the member.

BRIEF SUMMARY

This Summary is provided in order to introduce simplified concepts of the present disclosure, which are further described below in the Detailed Description. This summary is not intended to identify essential features of the claimed subject matter, nor is it intended for use in determining the scope of the claimed subject matter.

Revenue sharing models compensate members (also referred to herein as "entities") based at least in part on the size of their relationship networks, and in particular based at least in part on the number of entity groups within their relationship networks. An entity group is a predetermined number of entities with common connections to a single entity within the relationship network. Revenue sharing models include multiple phases. In a first phase, entities receive compensation for recruiting personal connections into the relationship network. In a second phase, the entities receive compensation based at least in part on the number of entity groups their personal connection entities recruit. In a third phase, the entities receive compensation based at least in part on the total number of entity groups within their relationship networks, no matter how many levels down in the relationship network those entity groups are.

BRIEF DESCRIPTION OF THE DRAWINGS

The Detailed Description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

Figure 1:
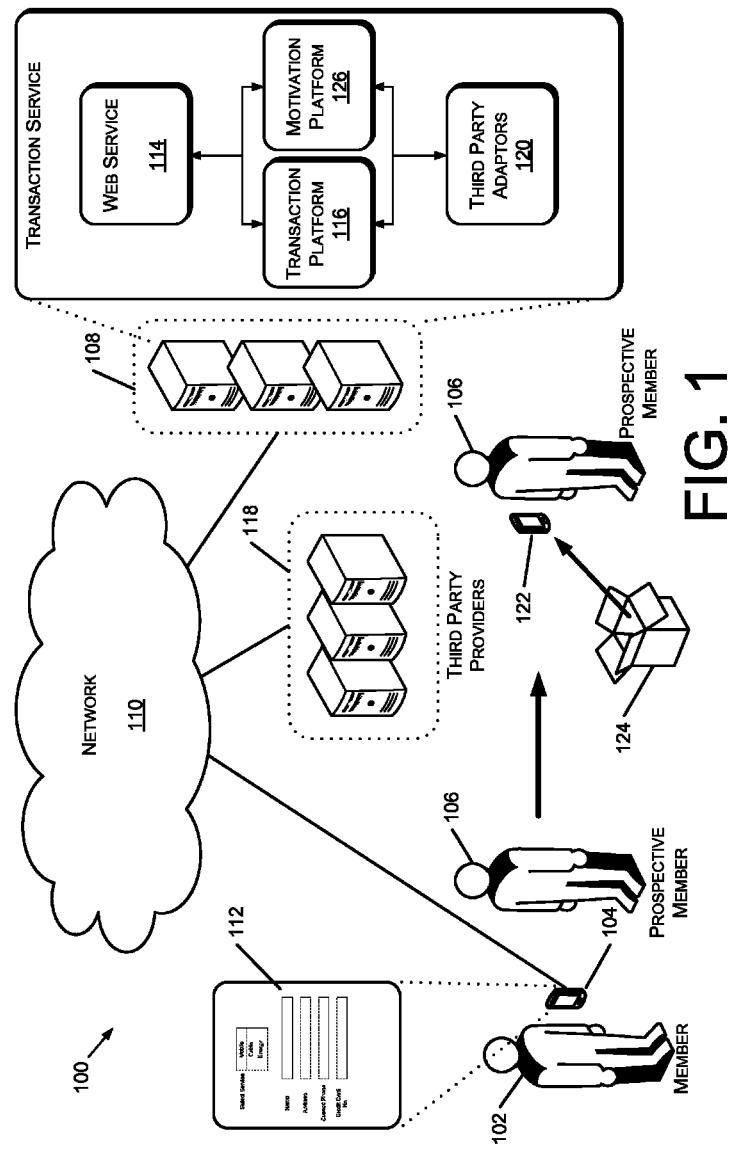
FIG. 1 is a schematic diagram of an example system for acquisition of new members using mobile device tools.

Embodiments of the present disclosure include revenue sharing models that are sustainable and that provide incentives for members to assist individuals in their networks, no matter how many levels away in the relationship network those individuals are. As noted above, in conventional direct sales models, members are paid lower percentages of the revenue generated at far-away levels within their networks. Thus, members in conventional direct sales models have little or no incentive to assist individuals at far-away levels to generate revenue through sales or to recruit new members.

Embodiments of the present application include revenue sharing models that pay members based at least in part on the size of their networks. The larger a member's network is, the more commissions that the member earns. In embodiments, the member is paid one-time or monthly-recurring bonuses based at least in part on the number of members (also referred to herein as "entities") within their networks. In embodiments, members are paid based at least in part on the number of entity groups within their networks. An entity group may be defined as a predefined number of entities (i.e., members) that all share a common connection to a single entity within a relationship network. For example, an entity group may be defined as a trio—three members—who have all been recruited by the same common entity. Other groupings may be used without departing from embodiments. For example, groups of two, four, five, six, or more entities may comprise an entity group.

Embodiments provide members with compensation based at least in part on compensation tiers and compensation bands. A member may receive bonuses at a first level when his or her relationship network reaches a first tier based at least in part on his or her relationship network having a first number of entities or entity groups. A member may receive bonuses at a second, higher, level if his or her relationship network reaches a second tier based at least in part on his or her relationship network having a second, higher, number of entities or entity groups. Likewise, groups of tiers, such as two, three, four, or more tiers, are grouped into compensation bands. Members may be provided one-time or monthly recurring compensation based at least in part on their relationship networks reaching a tier within a compensation tier or band that the member had not previously reached. This provides members with an incentive to continue growing the size of their networks.

Members are also compensated based on achieving every $n^{th}$ entity group, for example every second, third, fourth, fifth, sixth entity group, or other number of entity groups, within a personal network portion of a relationship network. A personal network may be the defined as those entities with direct connections to the member. In other embodiments, the personal network may include entities at levels one and two (those with direct connections to the member plus those with direct connections to those with direct connections to the member). More generally, a personal network includes entities at levels 1 through m below the member, with m being an integer.

Compensation according to embodiments may be provided as one or more of cash, credit, store credit (such as for participating vendors), gift cards, travel rewards, vehicle allowances, debt forgiveness, airline miles or other loyalty reward program credits, and so forth. In embodiments, compensation may be provided by depositing funds into an account associated with a debit card as is described in more detail below. Compensation may be provided on a one-time basis or on a recurring basis (such as hourly, daily, weekly, monthly, quarterly, annually, and so forth). Embodiments are not limited to providing compensation in these ways, and other compensation types are available without departing from the scope of embodiments.

Embodiments described herein include revenue sharing models for services that yield periodically recurring charges (such as daily, weekly, monthly, or yearly recurring charges). Such services include, but are not limited to, mobile phone services, internet services, cable services, energy services, and so forth. In these embodiments, members are provided with compensation—either one-time compensation or periodically recurring compensation—based at least in part on the number of entities, or entity groups, within the members' relationship networks.

Other embodiments described herein share revenue that is generated from product purchases, such as purchases made by members at participating retailers. In various embodiments, compensation is provided to members by depositing money into an account linked to a debit card. The purchases made on those debit cards are then tied back to the members' accounts, and compensation is determined from this data. In these embodiments, a certain percentage of the revenue from these purchases is set aside for sharing with members. In embodiments, a member is paid a percentage of the set aside revenue based at least in part on the number of entities, or the number of entity groups, within his or her relationship network (such as for example based at least in part on the member's compensation tier or band).

Because a member is paid based at least in part on the number of entities, or the number of entity groups, at any level within the member's relationship network, the member has an incentive to assist members at all levels of his or her relationship network obtain new members. Because there are gaps between compensation tiers, the model can be made sustainable. For example, a first tier may be based at least in part on having ten entities in a member's relationship network, while a second tier may be based at least in part on having 20 entities in the member's relationship network. In this example, the gap of ten entities between the first and second tiers enables the revenue sharing model to be sustainable—e.g., it does not pay out an exponential amount of money to the members—while maintaining an incentive for the members to assist entities within their relationship networks no matter how many levels away those entities are.

The processes, systems, and devices described herein may be implemented in a number of ways. Example implementations are provided below with reference to the following figures.

Example Environments for New Member Acquisition

Next, an example direct sales model related to mobile service will be described. Embodiments are not limited to this direct sales model. Later, example revenue sharing models based at least in part on network size and compensation tiers will be described.

FIG. 1 is a schematic diagram of an example system 100 for acquisition of new members using mobile device tools. Aspects of the system 100 may be implemented on various suitable computing device types. Suitable computing device or devices may include, or be part of, one or more personal computers, servers, server farms, datacenters, special purpose computers, tablet computers, game consoles, smartphones, media players, combinations of these, or any other computing device(s).

Member 102 is a mobile service subscriber and he or she accesses a mobile service using a mobile device 104. During interaction with a prospective member 106, the member 102 is able to use the mobile device 104 to access transaction service 108 via a network 110. The member 102 interacts with a user interface on mobile device 104 to launch one or more transaction screens, such as transaction screen 112, which enable the prospective member 106 to sign up for new service and to become a member.

The one or more transaction screens provide input fields for the member 102 and/or the prospective member 106 to input the prospective member's information to sign up for the service. Through the one or more transaction screens, the prospective member 106 and/or the member 102 selects a desired handset make and model, enters in existing mobile service information, enters in their address and credit card information, and so forth. The prospective member 106 also selects phone delivery methods, and provides other information to customize their new service and to facilitate signing up for new service. The mobile device 104 may include a camera or other scanner for imaging or otherwise scanning the prospective member's credit card. In embodiments, mobile device 104 may be equipped with Bluetooth or other short-range wireless capability in order to serve up the transaction screens directly to the prospective member's 106 existing mobile device so that the prospective member 106 can enter the information directly into their own existing device.

In one embodiment, the mobile device 104 accesses a web service 114 via an installed browser and a soft link on a user interface screen of the mobile device 104. In these embodiments, the one or more transactions screens are served by the web service 114, and the prospective member's information is provided to the transaction service 108 via the web service 114 and the network 110. One or more transaction screens may be cached or stored locally on the mobile device 104 to enable the browser to access them directly rather than via the web service 114.

In another embodiment, the mobile device 104 includes an installed application that accesses the transaction platform 116 directly, or through the web service 114. The installed application may present the one or more transaction screens and transmit the prospective member's information to the transaction service 108 via the network 110. Alternatively, the installed application may download the transactions screens, or portions of the transaction screens, from the web service 114 or other portion of the transaction service 108.

A transaction platform 116 creates a new member account for the prospective member 106 in a secure member database. The transaction platform 116 associates the new member account or service with the member's 102 existing account or service, thereby adding to a relationship network for the member 102. The new member account or service may also be associated with other members' accounts or services in whose relationship networks member 102 is a member. These other accounts or services may include an account or service of a member who signed up the member 102 and accounts or services of other members above the member who signed up the member 102. Based at least in part on these associations, the transaction platform 116 is enabled to provide member 102, as well as other associated members, with benefits—such as commissions—for signing up the prospective member 106.

The transaction platform 116 interacts with one or more third party providers 118 via various corresponding third party adaptors 120. The third party providers may include, among other things, a commissioning provider, a fulfillment provider, a bank provider, a social networking provider, and so forth. The third party providers 118 carry out various functions on behalf of the transaction service 108.

In one example, a fulfillment provider may be instructed by the transaction platform 116 to ship a new mobile device 122 to prospective member 106. In this illustration, the new mobile device 122 arrives in a box 124, although in other implementations, the new mobile device may be delivered to the prospective member 106 in other ways. The prospective member 106 activates the new mobile device 122 and begins using the mobile service. The prospective member 106 may opt-in during the activation process or at some other time to use his or her existing social networking services to seek out new members. New mobile device 122 comes pre-configured with the same or similar member acquisition tools as are on the mobile device 104. Thus, the prospective member 106 is also enabled to seek out and sign up additional members.

The prospective member may also have the option to receive a Subscriber Identity Module (SIM) card in lieu of a new mobile device, such as where the prospective member's existing mobile device is compatible with the mobile service. Upon receipt of the SIM card, the prospective member can swap out their old SIM card for the new SIM card and activate their new service using their existing mobile phone.

The network 110 may include one or more wired and/or wireless networks such as the public Internet, local area networks, wide area networks, mobile carrier networks, personal area networks (PAN), and so forth. The mobile device 104 may access the network 110 using various technologies such as through Bluetooth® or other PAN technologies, Wi-Fi® technologies based on the IEEE 802.11 family of standards, Global System of Mobile Communication (GSM) standards-based technologies, code division multiple access (CDMA) mobile phone standards, and so forth. Embodiments of the present disclosure are not limited to any type or types of networking technologies or protocols.

In various embodiments, the member 102 may utilize something other than a mobile phone to access the network 110 and sign the prospective member 106 up to a new service. Thus, mobile device 104 may be a mobile phone (such as a smartphone), a tablet computer, a laptop computer, a netbook computer, a personal computer, or other device that has access to the network 110. Embodiments are not limited to particular type or types of devices for accessing the transaction service 108.

The transaction service 108 also includes motivation platform 126. The motivation platform 126 provides real-time, highly relevant alerts, messages, and reports that include data indicating activities that the member 102 may engage in to achieve additional levels of compensation or to reach other goals. Such messages are meant to motivate the member 102 to perform these activities, thereby driving additional member sign-ups and other revenue-generating activities. For example, the motivation platform 126 may determine, based at least in part on commissioning information provided by the transaction platform 116, that the member 102 may achieve a reward, commission, or other compensation by signing up a certain number of additional new members to his relationship network, by attending webinars, or by engaging in other activities. In another example, the motivation platform 126 may determine that the new member 102 may achieve a new compensation tier, thereby enabling the member 102 to receive additional compensation, by signing up a certain number of new members to his or her network.

The motivation platform 126 creates a report, social network feed, email, alert, instant message, or other communication that includes the determined information and transmits it to the member 102. This may include sending social networking messages, via the third party adaptors, to reach a social networking provider. Alternatively or in addition, the motivation platform 126 may host or be associated with a social networking service that is accessible via the web service 114. The social networking messages may include message feeds, messages, reporting screens, and so forth. By providing the user with real-time, highly relevant data, the motivation platform is able to inform the member 102 as to those activities that he or she may perform to reach their commissioning goals. Various ones of the messages, reports, and alerts may be accessible to the member 102 via a member page, such as via a social networking page that is hosted by the transaction service.

The environment of FIG. 1 depicts a real-time interaction between the member 102 and the prospective member 106. Next, social media tools for acquisition of new members will be described.

Figure 2:
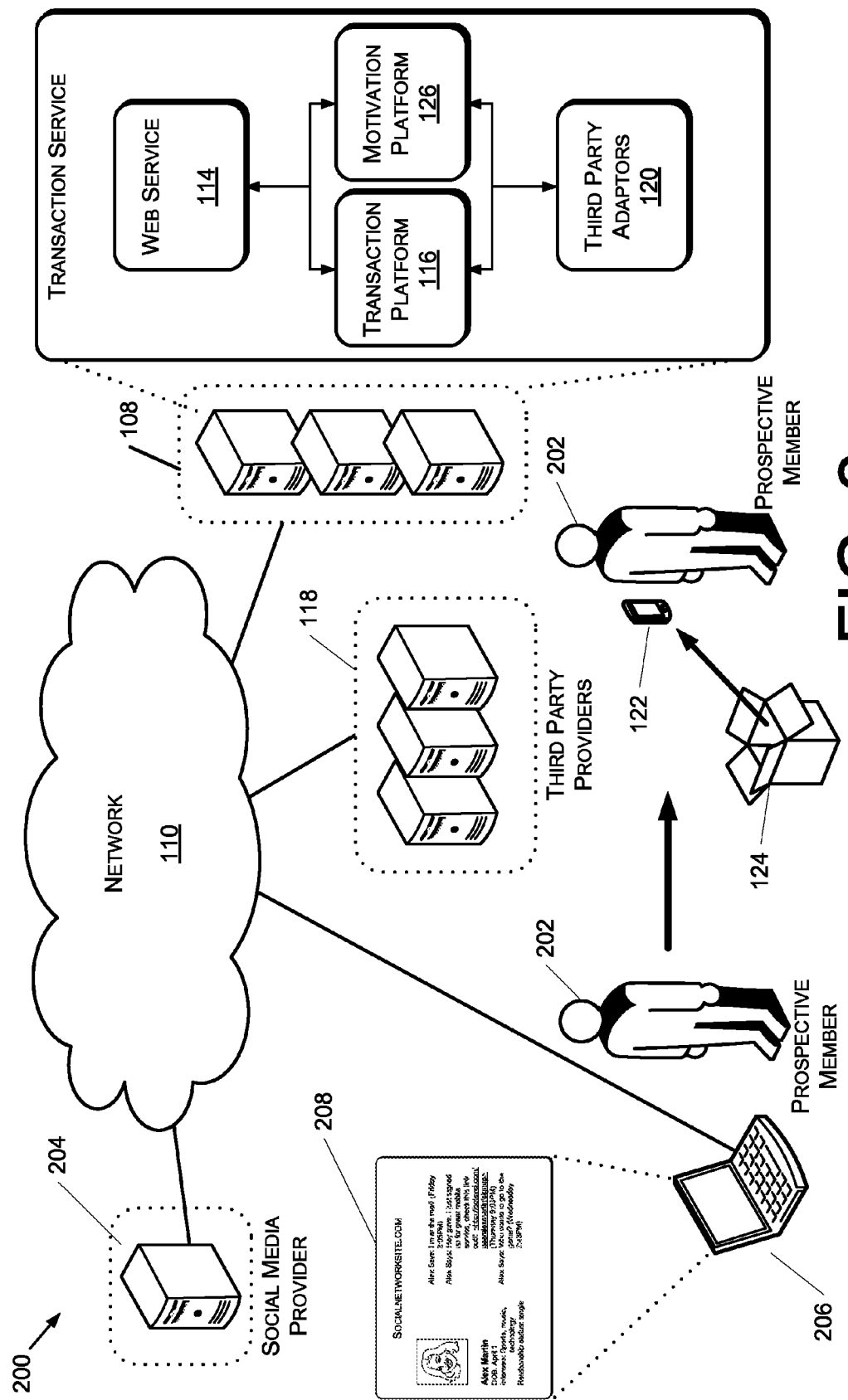
FIG. 2 is a schematic diagram of an example system for acquisition of new members using social media tools.

FIG. 2 is a schematic diagram of an example system 200 for acquisition of new members using social media tools. Referring to FIG. 2, a prospective member 202 accesses social media provider 204 using the personal computer 206. In embodiments, the prospective member 202 may utilize a netbook computer, a mobile phone, a tablet computer, or other device suitable for accessing the social media provider 204.

The personal computer 206 downloads social media page 208, which includes social media content. In one example, the social media page 208 is a social media page for an existing mobile service member, such as the member 102. The content on the social media page 208 includes a link to the web service 114. Clicking on the link within social media page 208 enables the prospective member 202 to browse to the web service 114 and to sign up for service through the transaction platform 116. Upon entering in their personal information and signing up for new mobile service, the prospective member 106 receives the new mobile device 122 (or a new SIM card) through a fulfillment provider of the third party providers 118 in the same or similar manner as is described with reference to FIG. 1.

The link to the web service 114 includes a resource identifier—such as universal resource identifier (URI) or a universal resource locator (URL)—that enables the personal computer 206 to access the web service 114. The link also includes embedded information that enables the transaction platform 116 to associate the existing member service with the newly created member service for the prospective member 106. This embedded information may be included as part of the URI or URL of the link. The embedded information may include some or all of the existing member's name, the existing member's phone number, the existing member's account number, a member number, or an anonymous identifier.

In this way, social media tools enable an existing member's online social media network to be leveraged for acquisition of new members. The transaction platform 116 utilizes the embedded information within social media links to associate the existing member's account or service to the new memberships that are generated through the link. The transaction platform 116 is configured to initiate bonus or commission payments for the existing member based at least in part on these associations, as is described below.

Example Participating Retailer Environment

Figure 3:
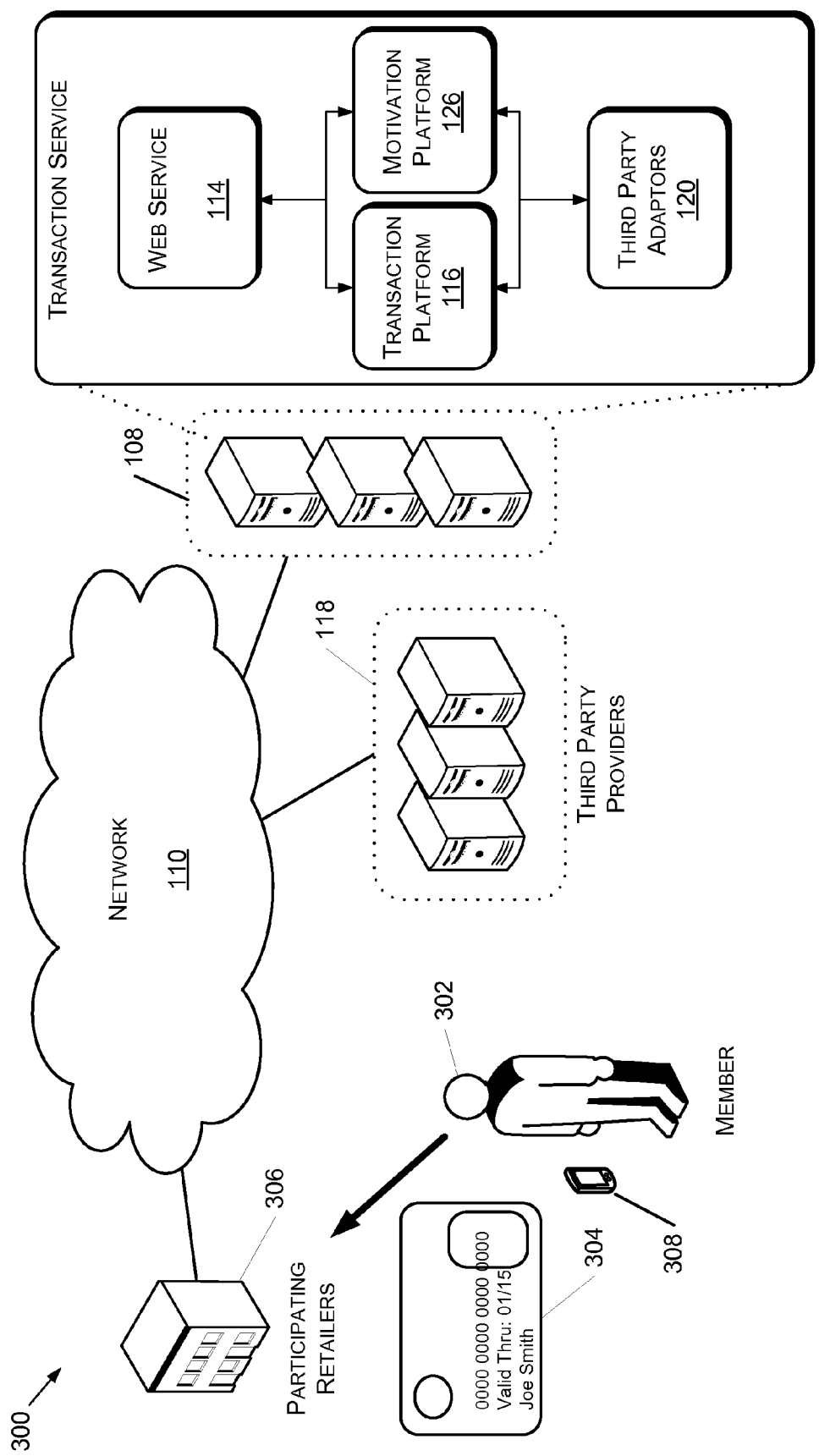
FIG. 3 illustrates an example environment for providing commissions based at least in part on purchases made at participating retailers.

FIG. 3 illustrates an example environment 300 for providing commissions based at least in part on purchases made at participating retailers. A member 302 receives compensation for participating in a revenue sharing model according to embodiments. In embodiments, the compensation that the member receives is deposited into an account, such as may be hosted by bank, which is one of the third party providers 118. The transaction platform 116 calculates compensation owed to the member 302 and causes it to be deposited into the account, such as for example via the third party adaptors 120. The account is associated with a transaction card 304, which may be a debit card, a credit card, member identification card, or other card type. The member 302 may utilize the transaction card 304 to make purchases at retailers that accept the transaction card 304. In alternative embodiments, the member 302 may utilize some other mechanism to correlate his or her purchases with the participating retailers 306 back to his or her member account. For example his or her mobile device (such as the mobile devices 104 and 122) may be used to make purchases. The transaction card 304 is just one mechanism to make payment at participating retailers 306. The member 302 may use instead of, or in addition to, his or her mobile phone 308 to make a payments with the participating retailers 306.

Some or all of the retailers that accept the transaction card 304 for purchases may be participating retailers 306. The participating retailers 306 provide a portion of the revenue from purchases made by members at the participating retailers 306 to the transaction service 108. The participating retailers 306 may be traditional "brick and mortar" retailers, or online retailers, or have both traditional and online retail operations. Purchases made by members with the participating retailers 306 may be used to calculate additional compensation for the member 302. For example, the transaction platform 116 may calculate compensation for the member 302 based at least in part on the portion of the purchases made by the member 302 and/or the purchases made by other members that are within his or her relationship network, as is described in more detail below.

Example Relationship Networks

Figure 4:
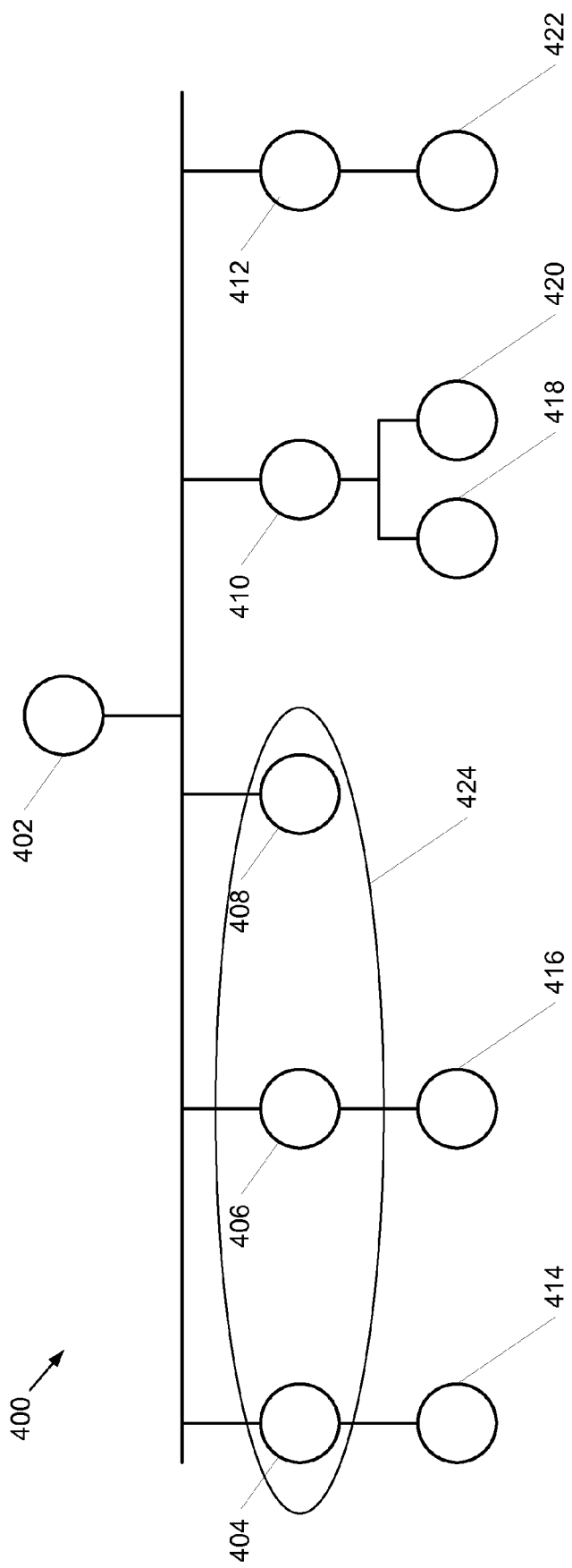
FIG. 4 illustrates an example relationship network during a first phase of an example revenue sharing model.
Figure 5:
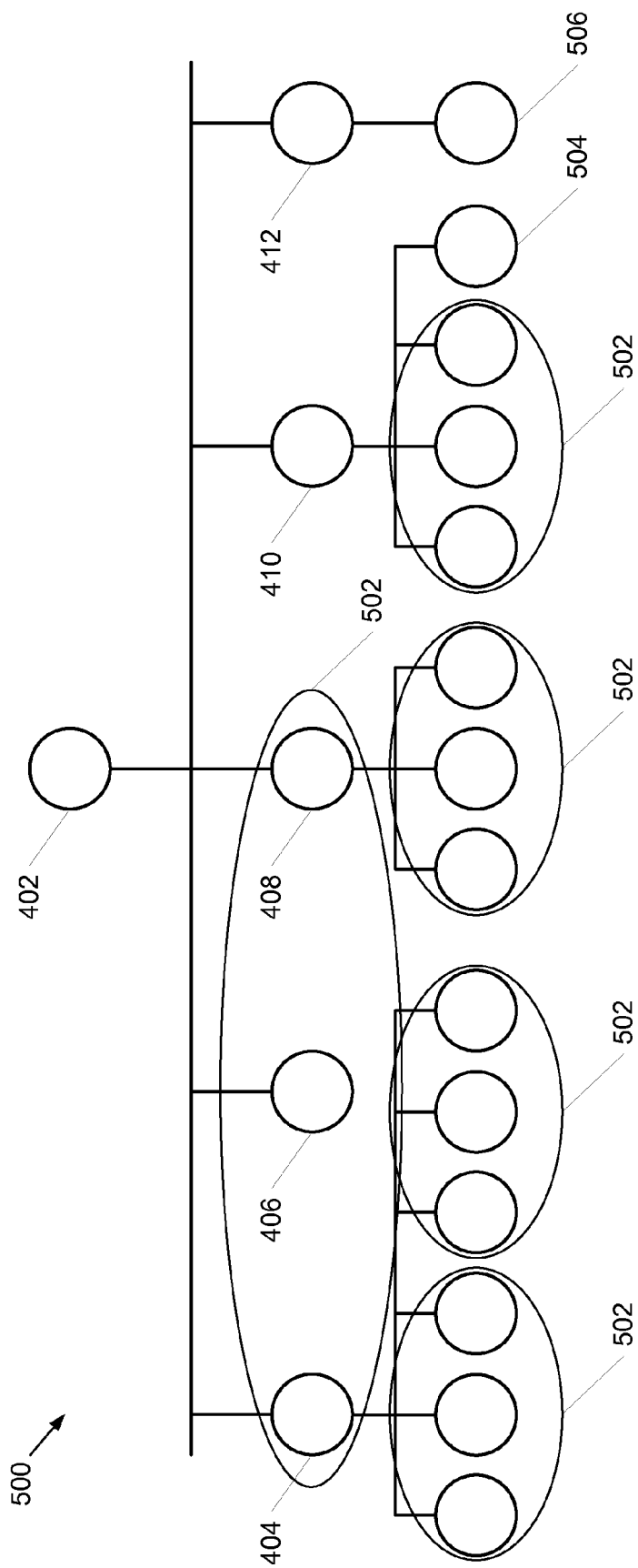
FIG. 5 illustrates an example relationship network during a second phase of an example revenue sharing model.
Figure 6:
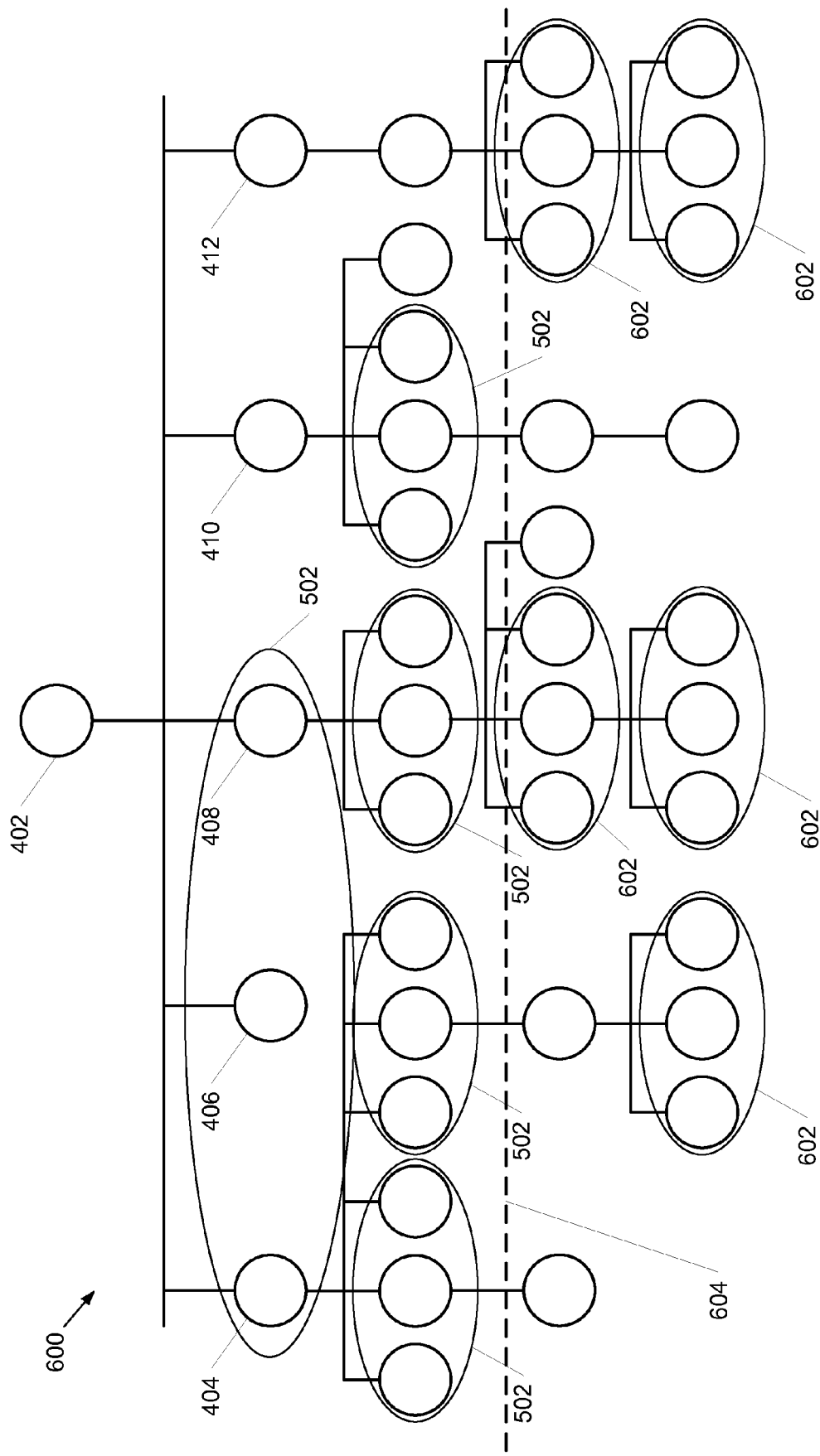
FIG. 6 illustrates an example relationship network during a third phase of an example revenue sharing model.

FIGS. 4-6 illustrate example relationship networks. Revenue sharing models according to embodiments utilize the size of a member's relationship network, such as the number of entity groups within the relationship network, to determine the level of compensation provided to members. An example revenue sharing model—described with reference to FIGS. 4-6—includes several components meant to address various stages of development of a member's relationship network. The first phase of the example revenue sharing model provides incentives for the member to recruit new entities to the network. The first phase is put in place during a ramp-up period, such as for a period of time between 30 and 120 days, or other time period. The second phase of the example revenue sharing model provides incentives for a member to assist his personal entity connections—those entities that the member directly recruited—to recruit new members. The second phase of the example revenue sharing model may also last for a limited period of time, such as for the first 30-120 days of the member's association with the model. The third phase of the example revenue sharing model provides various incentives over the long term for the member to continue to grow his or her relationship network and drive purchases by members of his network at any level within the relationship network.

FIG. 4 illustrates an example relationship network 400 during a first phase of an example revenue sharing model. An entity 402—such as member 102—sits atop the relationship network 400. The entity 402 may start out with no other entities within its relationship network 400, but eventually recruits personal connection entities 404-412. For example, the prospective member 106 may be one of the personal connection entities 404-412 within the relationship network 400. The personal connection entities 404-412 may also recruit additional network entities 414-422 into the relationship network 400.

In the first phase of the example revenue sharing model, which may last a specified period of time such as 30-120 days or other time period, the entity 402 receives a one-time and/or monthly bonus based at least in part on the number of personal connection entities within the relationship network 400. In one non-limiting example, the entity 402 is provided with a one-time per-connection bonus, such as a $5 bonus or other bonus or compensation (such as gift cards, vendor credit, etc.), for each one of personal connection entities 404-412 within the relationship network 400. Because there are five personal connection entities in the example relationship network 400, entity 402 may receive, according to this example, a $25 one-time bonus. These bonuses may be monthly recurring, such as during the 30-120 day ramp-up period, some period of time longer than the ramp-up period, or indefinitely for as long as personal connection entities 404-412 signed up during the ramp-up period remain part of the relationship network 400.

During the first phase of the example revenue sharing model, the member may also receive monthly recurring or one-time compensation based at least in part on the number of entity groups within its personal connection entities 404-412. In the example shown in FIG. 4, an entity group is characterized as having three entities (a "trio"), and personal connections 404, 406, and 408 form an entity group 424. Other entity groups, having different numbers of entities, may be used without departing from the scope of embodiments. Were entity 402 in the example shown in FIG. 4 to recruit one more personal connection entity, then relationship network 400 would have two entity groups. Were the entity 402 then to recruit a further three, six, or nine additional personal connection entities, then the relationship network 400 would have three, four, and five entity groups, respectively.

In a non-limiting example, the example revenue sharing model may provide members with a one-time entity group bonus for recruiting personal connection entities during a ramp-up period (or other time period) according to the following table:

TABLE 1

| Number of entity groups | One-time bonus |
| --- | --- |
| 1 | $50 |
| 2 | $100 |
| 3 | $200 |
| 4 | $300 |

Upon recruiting the first entity group within its personal connection entities, the entity 402 would receive a $50 bonus. Upon recruiting the second entity group, the entity 402 would receive an additional $100 bonus, and so forth. Were the entity 402 to recruit four entity groups (twelve total personal connection entities), the entity 402 would receive a total bonus of $650 ($50+$100+$200+$300). More or fewer entity group bonus levels, and smaller or larger bonuses may be paid at the different levels, without departing from the scope of embodiments. The first phase of the example revenue sharing model thus provides an incentive for the entity 402 to bring in personal connection entities during the ramp-up period.

FIG. 5 illustrates an example relationship network 500 during a second phase of an example revenue sharing model. The entity 402 sits atop the relationship network 500. In the example shown in FIG. 5, the relationship network 500 includes personal connection entities 404-412. The personal connection entities 404-412 may also recruit additional network entities into the relationship network 500.

During the second phase of the example revenue sharing model, the entity 402 is provided with compensation based at least in part on the number of personal entity groups 502 that within a personal network portion of the relationship network 500. In the example shown in FIG. 5, a personal entity group is characterized as having a predetermined number of entities, such as three entities (a "trio"), with direct connections to a common one of personal connection entities 404-412. A personal entity group may have more or fewer entities without departing from the scope of embodiments. In one non-limiting example, as illustrated in Table 2, the entity 402 is provided a one-time or recurring bonus of $20 based at least in part on the number of personal entity groups 502 within relationship network 500. In the example shown in FIG. 5, network entities 410, 412, 504 and 506 are part of a personal network portion of the relationship network 500, but are not part of a personal entity group. Were the entity 402 to add one more personal connection, or either of personal connection entities 410 or 412 to add two more entities to the relationship network 500 directly under them, then relationship network 500 would have an additional personal entity group.

TABLE 2

| Number of personal entity groups | One-time bonus |
|---|---|
| 1 | $20 |
| 2 | $40 |
| 3 | $60 |
| 4 | $80 |

As discussed above with respect to FIG. 4, the personal connections entities 404-412 receive compensation for bringing in personal connection entities during at least the first phase of the revenue sharing plan. And the example revenue sharing model also provides an incentive, during at least the second phase, for entity 402 to assist the personal connection entities 404-412 in bringing in more entities, thereby aligning the interests of the entity 402 and the personal connection entities 404-412.

FIG. 6 illustrates an example relationship network 600 during a third phase of an example revenue sharing model. The entity 402 sits atop the relationship network 600. In the example shown in FIG. 6, the relationship network 600 includes personal connection entities 404-412. In the third phase of the example revenue sharing model, which may last an indefinite period of time for as long as the entity 402 remains a member, the entity 402 receives compensation for the number of personal entity groups 502 within a personal network and/or the number of network entity groups 602 within an extended network of the relationship network 600. In the example shown in FIG. 6, the personal network is defined as those entities and entity groups above line 604, thereby including two levels of entities within the personal connection network. Embodiments include relationship networks that include more or fewer levels within the personal connection network. The extended network may be defined as including those levels below the line 604. A network entity group 602 is characterized as having a predetermined number of entities (such as three entities, i.e., a "trio") with connections to a common one of a network entity other than the personal connection entities 404-412. A "network" entity is either a personal connection entity or a non-personal connection entity.

The entity 402 receives compensation based at least in part on the number of entity groups, including the number of personal entity groups, within the relationship network. An entity group is either a personal entity group or an entity group. In embodiments, the entity is provided with compensation based at least in part on a combination of the number of entity groups and the number of the entity groups that are personal entity groups. The following table is a non-limiting example of a revenue sharing model that provides compensation based at least in part on a combination of the number of entity groups and the number of entity groups that are personal entity groups.

TABLE 3

| Band | Tier | No. of network entity groups | No. which are personal entity groups | Line Rule | % Rule | One-time Career Path bonus | Monthly Career Path Bonus | Product Sales % |
|---|---|---|---|---|---|---|---|---|
| 1 | 1a | 1 | 1 | 1 | 100% | $0 | $0 | 3.3% |
|   | 1b | 3 | 1 |   |   | $0 | $20 |   |
|   | 1c | 5 | 2 |   |   | $0 | $50 |   |
| 2 | 2a | 10 | 2 | 3 | 50% | $800 | $200 | 2.1% |
|   | 2b | 25 | 3 |   |   | $0 | $500 |   |
|   | 2c | 50 | 4 |   |   | $0 | $1000 |   |
| 3 | 3a | 100 | 6 | 6 | 40% | $3000 | $2000 | 1.05% |
|   | 3b | 200 | 7 |   |   | $0 | $3000 |   |
|   | 3c | 300 | 8 |   |   | $0 | $4000 |   |
| 4 | 4a | 400 | 10 | 9 | 40% | $5000 | $5000 | .35% |
|   | 4b | 500 | 11 |   |   | $0 | $6000 |   |
|   | 4c | 600 | 12 |   |   | $0 | $8000 |   |
| 5 | 5a | 800 | 14 | 12 | 40% | $15,000 | $10,000 | .35% |
|   | 5b | 900 | 16 |   |   | $0 | $15,000 |   |
|   | 5c | 1000 | 20 |   |   | $0 | $30,000 | $20,000 |

Table 3 is split up into fifteen compensation tiers grouped into five compensation bands. Although the five compensation bands are labeled 1-5, and the fifteen compensation tiers are labeled 1a, 1b, 1c, and so forth, other labels or names may be used in various embodiments. Also, more or fewer tiers and/or compensation bands may be used in various embodiments. According to the example shown in Table 3, the entity 402 obtains a total of one entity groups, of which at least one entity group is a personal entity group (an entity group within the personal network portion of relationship network 600), in order to reach compensation tier 1a. Thus, as long as the entity 402 has at least one personal entity group, the entity 402 achieves compensation tier 1a. To reach the 1b compensation tier, the entity 402 obtains three entity groups in the relationship network 600, of which at least one is a personal entity group. To reach tier 3b, the entity 402 obtains 200 entity groups, of which at least seven are personal entity groups, and so forth.

The entity 402 is provided with either one-time compensation or a monthly compensation based at least in part on the achieved compensation tier and/or compensation band. In the example shown in Table 3, achieving compensation tier 1c results in the entity 402 receiving $50/month in compensation. Achieving compensation tier 2a, on the other hand, results in the entity 402 receiving a one-time bonus of $800 and a $200/monthly compensation. The entity 402 receives a one-time bonus of $800 based at least in part on achievement of a compensation tier within a compensation band that the entity 402 had not previously achieved.

The entity 402 may also receive a personal network bonus or compensation based on the number of entity groups within the personal network. This is in addition to the monthly or one-time career path bonus described in Table 3, and may be separate from the compensation tier determination. In embodiments, the entity 402 may receive a one-time or recurring personal network bonus for every $n^{th}$ entity group within the personal network. In one example, the entity 402 receives the personal network bonus for every third entity group (which may be called a "triple trio" or "trip trio" in embodiments where three entities form an entity group), and thus would receive increased personal network bonuses for every $3^{rd}$, $6^{th}$, $9^{th}$, and $12^{th}$ personal entity group, and so on.

Other personal network bonuses are possible without departing from the scope of embodiments. For example, the entity 402 may be compensated based on the number of entities (not the number of entity groups) within the personal network. Also, a personal entity group within the personal network may have fewer or more entities than an entity group within the extended network. In one such example, a personal entity group includes three entities while an entity group within the extended network includes five entities.

The entity 402 receives compensation based at least in part on the number of entities within the relationship network 600. When determining the compensation tier or band that the entity 402 achieves, it does not matter, in embodiments, how many levels below the entity 402 the entities or entity groups within the extended network are. The entity 402 achieves the same compensation tier for entities far down in the extended network as for those closer to the top of the extended network. Thus, the entity 402 has an incentive to assist entities anywhere within their relationship networks recruit new entities.

Achieving a compensation tier or band may be subject to various constraints. Two example constraints are the line rule and the percent rule, as are described below. Other constraints are possible without departing from the scope of embodiments.

Line Rule

The line rule constraint, as indicated by the "line rule" column in Table 3, indicates the number of personal connection entities that the entity 402 achieves in order to achieve a particular compensation band. In the example shown in Table 3, to achieve compensation band 3, the entity 402 obtains at least six personal connection entities (not personal entity groups). Thus, where the line rule constraint applies, the compensation tier or band achieved by the entity 402 is determined both by the number of entity groups within the personal network (the fourth column of Table 3) as well as the number of personal connection entities.

Percent Rule

The Percent rule constraint, as indicated by the "% rule" column in Table 3, indicates a maximum percentage of the network entities or entity groups that are allowed to come under a single personal connection entity in order to achieve a compensation tier. In the example shown in Table 3, to achieve compensation band 3, the entity 402 obtains at least 100 entity groups with no more than 40% of them connected to the entity 402 through a single personal connection entity. For example, if the entity 402 had 100 entity groups in the network 600, but more than 40 of those entity groups were under personal connection entity 404, then the entity 402 would not achieve compensation band 3, and would remain at compensation tier 2c within compensation band 2.

Purchase Revenue Bonuses

The "product sales" column in Table 3 indicates a percentage of revenues that the entity 402 receives for certain purchases made by entities within the relationship network 600. As noted elsewhere within this Detailed Description, entities may be provided with compensation by depositing funds into a bank account connected to a transaction card. The entities use the transaction card to make purchases. In other embodiments, alternative payment mechanisms are used to access the compensation funds. For example, the entity 402 may utilize payment technology on their mobile device, such as the mobile device 104, to make payments.

When purchases are made by the entities at participating retailers, the participating retailers provide a portion of the purchase back to the revenue sharing model. A percentage of the revenue provided to the revenue sharing model is set aside for compensating the entities (such as the entities in the relationship network 600, as well as other entities in other relationship networks). Depending on the compensation tier achieved by the entity 402, the entity receives a first purchase bonus that is based at least in part on a percentage of a first portion of the set-aside revenue that is attributable to the purchases made by the entities within relationship network 600.

In embodiments, a second purchase bonus not shown in Table 3 is paid to entities based at least in part on their own personal purchases. For example, a second portion of the set-aside revenue may be paid to the entities based at least in part on a ratio of the entities' personally-generated revenue to overall revenue generated from all purchases by all entities. Thus, in one example, if purchases made by the entity 402 account for 5% of all revenue generated from purchases at participating retailers, then the entity 402 would receive 5% of the second portion of the set aside revenue.

Top Performer Bonus

Revenue sharing models according to embodiments also provide a top performer bonus, paid to those entities participating in the revenue sharing model designated as a "top performer." The top performer bonus may be paid out of a pool of funds that represents a percentage of gross revenues, or some other pool. The top performer bonus is paid to the top performers for certain activities, such as signing up personal connection entities, adding entity groups to their networks, advancing to a new compensation tier or compensation band, and so forth. The top performer bonus may be provided on a daily, weekly, monthly, quarterly, or annual basis, or on some other time basis.

New Member Bonus

Revenue sharing models according to embodiments also provide a new member bonus, paid to entities that have joined within a certain period of time, such as for example between 30-120 days or other time period. The new member bonus may be paid out of a pool of funds that represents a percentage of gross revenues, or some other pool. The top performer bonus is paid to the new members for performing certain activities, such as attending conferences, webinars, meetings, signing up personal connection entities, adding entity groups to their networks, and so forth.

Example Transaction System

Figure 7:
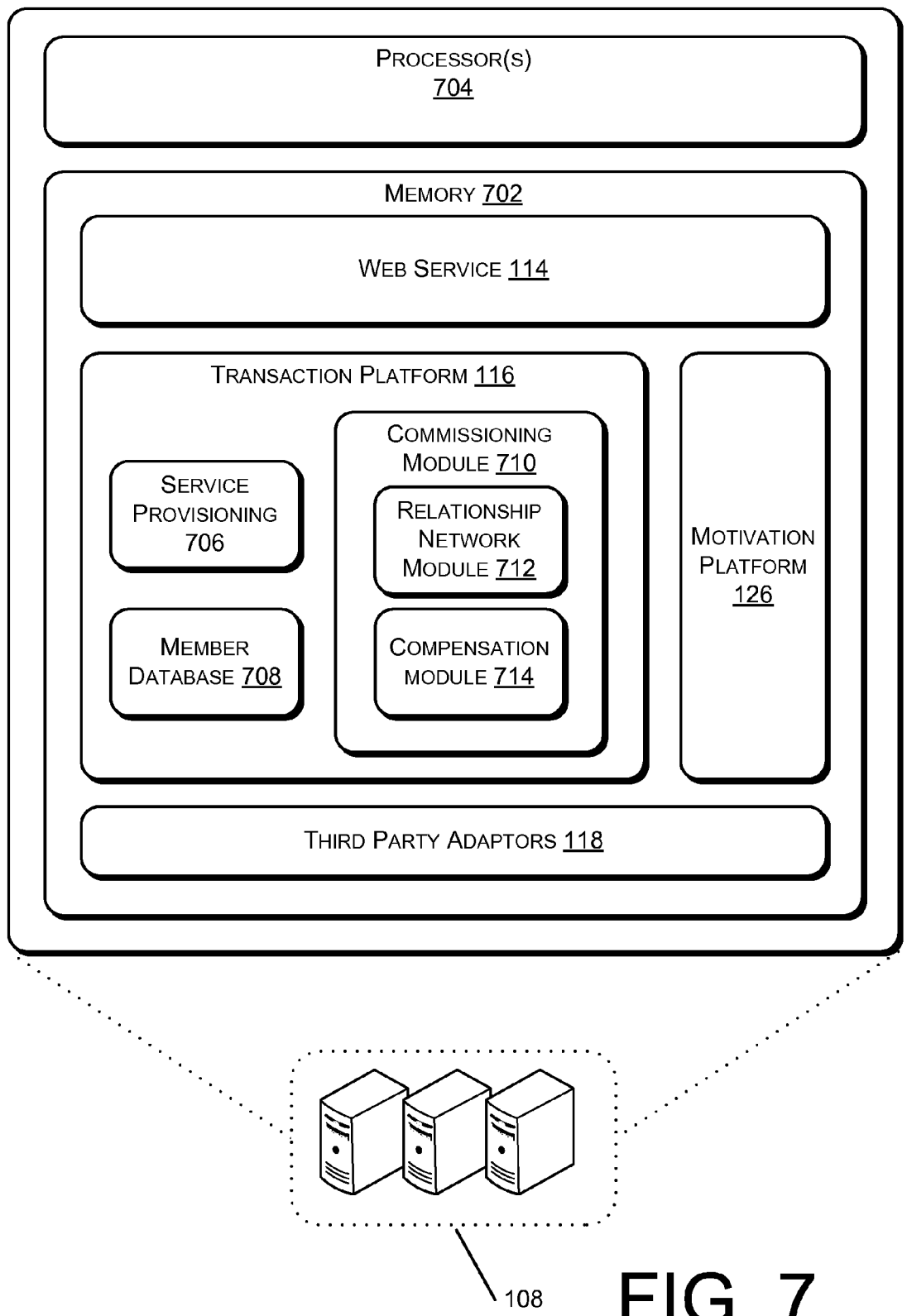
FIG. 7 is a block diagram of an example computing system usable to provide a transaction service.

FIG. 7 is a block diagram of an example computing system usable to provide a transaction service. The transaction service 108 may be configured as any suitable computing device or computing devices capable of implementing member acquisition tools. According to various non-limiting examples, suitable computing devices may include or be part of personal computers (PCs), servers, server farms, datacenters, special purpose computers, tablet computers, game consoles, smartphones, media players, combinations of these, or any other computing device(s).

Memory 702 may store program instructions that are loadable and executable on the processor(s) 704, as well as data generated during execution of, and/or usable in conjunction with, these programs.

Memory 702 includes the web service 114, the transaction platform 116, and the third party adaptors 120. The transaction platform 116 includes a service provisioning module 706 which receives service provisioning information for a prospective member from the web service 114. The service provisioning request may be for a communication service (such as a wireless phone service), a television service, an energy service, or some other service. The service provisioning module 706 initiates the provisioning of a new member service for the prospective member, which includes writing the prospective member's information to the member database 1208. The service provisioning module 706 communicates with the third party adaptors 120 to facilitate the provisioning of the service for the prospective member, including the fulfillment of delivery of the handset or other device to the prospective member.

Additionally, the service provisioning module 706 receives existing member information that corresponds to the member that is responsible for signing the prospective member up to new service. For example, the prospective member may sign up for the new service after clicking on a link to the transaction service 108 in the existing member's social networking page. In another example, the prospective member may sign up for the new service by interacting with the existing member who uses a member acquisition tool on their mobile device to sign up the prospective member to new service. As part of that process, the existing member's information is forwarded to the service provisioning module 706. In the case of a soft link on the existing member's phone, and/or in the case of the prospective member clicking on a social networking link, the existing member information may be embedded within a resource identifier (such as a URL or URI). In any event, the service provisioning module 706 causes the new service for the prospective member to be correlated in the member database 708 with the existing member service. The prospective member may be provided with an option to verify the identity of the referring member.

A commissioning module 710 is configured to initiate commissioning calculations for the members, such as based at least in part on a revenue sharing model according to various embodiments. This process includes looking up members in a member's network, as indicated by the correlations between the members' accounts in the member database 708. In one example, if a first member signs up a second member, the first member receives a commission payment based at least in part on the second member's service payments. The commission payments may be calculated weekly, monthly, quarterly, annually, or at some other rate according to various embodiments. The commission payments may be one-time payments. Alternatively, the commission payments may be calculated and paid on an ongoing basis (i.e., monthly, quarterly, etc.). The commission payments may be based at least in part on an initial sign-up of the new member, or they may be based at least in part on a portion of the new member's recurring charges. In embodiments, the commissioning module 710 deposits the compensation as funds into an account held at one of the third party providers 118 via the third party adaptors 120. The funds in the account may be tied to a debit card issued to the entity. The commissioning module 710 may be configured to track purchases made by the entities at participating retailers.

A relationship network module 712 determines a relationship network associated with an entity, such as relationship networks 400, 500, and 600. The relationship network includes a plurality of network entities and connections between the network entities. A compensation module 714 causes the entity to be provided with compensation based at least in part on a number of entity groups within the relationship network, as is described elsewhere within this Detailed Description, such as with reference to FIGS. 4-6.

In embodiments, the entity groups include network entities that have direct connections to common network entities. In alternative embodiments, an entity group is characterized as having a predetermined number of entity groups anywhere within the relationship network, not necessarily with connections to common network entities. In embodiments, an entity group may have 2, 3, 4, 5, or more entities.

The relationship module 712 determines a subset of the plurality of network entities that have direct connections to the entity (i.e., "personal connection entities"). The compensation module 714 may determine the compensation based at least in part on a first number of entity groups within a personal network portion of the relationship network (i.e., "personal entity groups") and on a second number of network entity groups within the relationship network (which includes the "personal entity groups").

As part of the compensation calculation, the compensation module 714 determines a compensation tier for the entity based at least in part on the number of entity groups in the relationship network, as is described elsewhere within this Detailed Description, such as with reference to FIGS. 4-6. And the compensation module 714 causes the compensation to be provided to the entity based at least in part on the compensation tier. The compensation module 714 may also calculate, and cause to be provided, other compensation to be provided to the entity based at least in part on the determined compensation tier and purchases made by network entities within the relationship network, as is described elsewhere within this Detailed Description.

In embodiments, achieving a compensation tier may be based least in part on constraints, such a percent rule and/or a line rule, as is described elsewhere within this Detailed Description. To implement the line rule, the relationship network module 712 determines the number of the plurality of network entities with direct connections to the entity, and the compensation module 714 determines the compensation tier further based at least in part on whether the number of the plurality of network entities with direct connections to the entity is greater than or equal to a minimum number for the determined compensation tier.

To implement the percent rule, the relationship network module 712 determines, for individual ones of a subset of the plurality of network entities with direct connections to the entity (i.e., the personal connection entities), and the relationship network module 712 determines corresponding percentages of the plurality of entity groups that connect to the entity via the individual ones of the subset. The compensation module 714 calculates and causes compensation to be provided based at least in part on the corresponding percentages, as is described above.

Memory 702 also includes the motivation platform 126.

Example Operations for Providing Compensation

Figure 8:
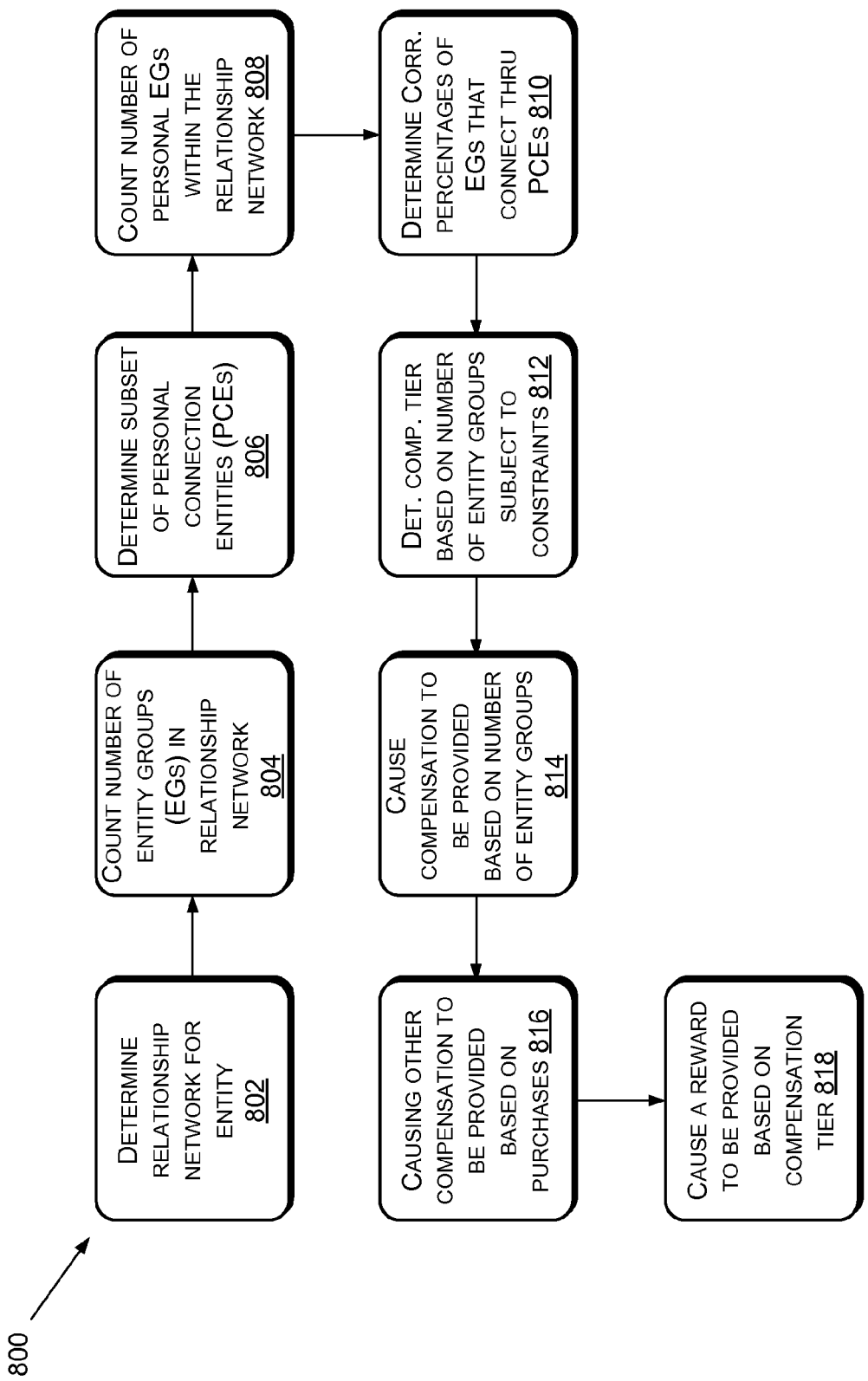
FIG. 8 is a flow diagram showing an example process for providing compensation based at least in part on a number of entities in a relationship network.

FIG. 8 is a flow diagram showing an example process 800 for providing compensation based at least in part on a number of entities in a relationship network. At 802, a relationship network module, such as the relationship network module 712, determines a relationship network associated with an entity. The relationship network includes a plurality of network entities and connections between the plurality of network entities. The relationship network module may determine relationship networks for a plurality of entities. In fact, all of process 800 may be repeated for each entity participating in a revenue sharing model, including those entities that are in another entity's relationship network.

At 804, a compensation module, such as the compensation module 714, counts a number of entity groups in the relationship network. This may include counting entity groups within both a personal network and an extended network of the relationship network. As described elsewhere within this Detailed Description, individual ones of the entity groups have a predetermined number of network entities. In embodiments, the entity groups are characterized by having a predetermined number of network entities with direct connections to common network entities that are associated with the individual ones the entity groups. In embodiments, the relationship network is associated with one or more of a mobile telephony service, an energy service, an entertainment service, a broadband service, or other services such as a recurring service. The entity and/or the network entities within the relationship network are subscribers to one or more of the mobile telephony service, an energy service, an entertainment service, a broadband service, or other service.

At 806, the compensation module determines a subset of the plurality of network entities with direct connections to the entity (i.e., the personal connection entities). This subset may be used in part to determine one or more of the line rule constraint and a percent rule constraint as described elsewhere within this Detailed Description.

At 808, the relationship network module counts the number of entity groups within the personal network portion of the relationship network. This may be used to determine the compensation tier as is described elsewhere within this Detailed Description.

At 810, the relationship network module determines the percentages of the plurality of entity groups that connect to the entity via the individual ones of the personal connection entities. This may be used to implement the "percent rule" constraint as is described elsewhere within this Detailed Description.

At 812, the compensation module determines a compensation tier that the entity has achieved based at least in part on the number of entity groups in the relationship network and subject to the constraints (such as the line rule constraint and the percent rule constraint or other constraints). In embodiments, the determined compensation tier is one of a plurality of compensation tiers. The plurality of compensation tiers may be characterized as being associated with corresponding minimum numbers of entity groups, as is described elsewhere within this Detailed Description. Subsets of the compensation tiers are grouped into compensation bands, which may be used as a further basis to provide one-time or recurring compensation to the entity as is described elsewhere within this Detailed Description. The number of entity groups and the number of those entity groups with direct connections to the personal connection entities may determine the compensation tier.

At 814, the compensation module causes the entity to be provided with compensation that is based at least in part on the number of entity groups in the relationship network, such as based on the compensation tier achieved by the entity. In embodiments, the compensation is provided based at least in part on a combination of the number of entity groups in an extended network of the relationship network and the number of those entity groups within a personal network portion of the relationship network.

In embodiments, the compensation may be provided based at least in part on a percent rule constraint. In other words, the compensation may be based at least in part on the determined percentages of the number of entity groups with connections to individual ones of the personal connection entities. The percent rule constraint represents a maximum percentage of the number of entity groups that can reach the entity through a single personal connection entity within the entity's relationship network in order to achieve a particular compensation tier or band.

In embodiments, the compensation may be determined based at least in part on a line rule constraint, and the compensation therefore provided based at least in part on the number of the plurality of network entities with direct connections to the entity (i.e., the number of personal connection entities).

At 816, the compensation module causes the entity to be provided with other compensation based at least in part on purchases made by network entities within the relationship network. The other compensation may be provided based at least in part on a determined commissioning tier or band. For example, a determined compensation tier or band may have an associated percentage of the set-aside revenue that is paid to the entities that reach that particular compensation tier or band.

At 818, the compensation module causes the entity to be provided with a reward based at least in part on achievement of a compensation tier that is within a compensation band not previously achieved by the entity. In embodiments, the reward may be a one-time reward, or a periodically recurring reward.

FIG. 8 depicts a flow graph that shows example processes in accordance with various embodiments. The operations of these processes are illustrated in individual blocks and summarized with reference to those blocks. These processes are illustrated as a logical flow graph, each operation of which may represent a set of operations that can be implemented in hardware, software, or a combination thereof. In the context of software, the operations represent computer-executable instructions stored on one or more computer storage media that, when executed by one or more processors, enable the one or more processors to perform the recited operations. Generally, computer-executable instructions include routines, programs, objects, modules, components, data structures, and the like that perform particular functions or implement particular abstract data types. The order in which the operations are described is not intended to be construed as a limitation, and any number of the described operations can be combined in any order, separated into sub-operations, and/or performed in parallel to implement the process. Processes according to various embodiments of the present disclosure may include only some or all of the operations depicted in the logical flow graph.

Computer-Readable Media

Depending on the configuration and type of computing device used, memory 702 may include volatile memory (such as random access memory (RAM)) and/or non-volatile memory (such as read-only memory (ROM), flash memory, etc.). Memory 702 may also include additional removable storage and/or non-removable storage including, but not limited to, flash memory, magnetic storage, optical storage, and/or tape storage that may provide non-volatile storage of computer-readable instructions, data structures, program modules, and other data for mobile device 104 or transaction service 108.

Memory 702 is an example of computer-readable media. Computer-readable media includes at least two types of computer-readable media, namely computer storage media and communications media.

Computer storage media includes volatile and non-volatile, removable and non-removable media implemented in any process or technology for storage of information such as computer-readable instructions, data structures, program modules, or other data. Computer storage media includes, but is not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device.

In contrast, communication media may embody computer-readable instructions, data structures, program modules, or other data in a modulated data signal, such as a carrier wave, or other transmission mechanism. As defined herein, computer storage media does not include communication media.

Conclusion

Although the disclosure uses language that is specific to structural features and/or methodological acts, the invention is not limited to the specific features or acts described. Rather, the specific features and acts are disclosed as illustrative forms of implementing the invention.

What is claimed is:

1. A method, comprising:
    determining, by a computing system from correlation data that describes connections between subscribers to a telephony service, a plurality of the subscribers that are within a relationship network of a particular subscriber, the plurality of the subscribers having direct connections to the particular subscriber or direct connections to other subscribers within the relationship network;
    determining, by the computing system, one or more subscriber groups within the relationship network, individual ones of the subscriber groups having a predetermined number of subscribers with direct connections to common ones of the plurality of the subscribers;
    determining a number of subscriber groups within the relationship network;
    determining a level of compensation to be provided to the particular subscriber, the determining including
        referencing a tiered compensation structure in which compensation tiers are based at least on numbers of subscriber groups within the relationship network, and
        identifying a compensation tier for the particular subscriber based on the number of subscriber groups within the relationship network; and
    causing, by the computing system, the particular subscriber to be provided with compensation that is based at least in part on the identified compensation tier.

2. The method of claim 1, further comprising determining a first subset of the subscriber groups within a personal network and a second subset of the subscriber groups within an extended network, and wherein the determining a level of compensation further includes identifying the compensation tier for the particular subscriber based on a first number of subscriber groups within the first subset and a second number of subscriber groups within the second subset.

3. The method of claim 1, wherein individual ones of the compensation tiers are characterized as being associated with corresponding minimum numbers of subscriber groups.

4. The method of claim 1, wherein subsets of the plurality of compensation tiers are grouped into compensation bands, and wherein the method further comprises causing the particular subscriber to be provided with a reward, in addition to the level of compensation, the reward based at least in part on achievement of a new compensation tier that is within a compensation band not previously achieved by the particular subscriber.

5. The method of claim 1, wherein the method further comprises causing the particular subscriber to be provided with other compensation based at least in part on purchases made by network subscribers within the relationship network.

6. The method of claim 5, wherein the causing the other compensation to be provided is based at least in part on a percentage factor associated with the identified compensation tier for the particular subscriber, the other compensation calculated by using the percentage factor to determine a percentage of total purchase value of the purchases made by the network subscribers.

7. The method of claim 1, further comprising:
    determining a subset of the plurality of subscriber groups within the relationship network with direct connections to the particular subscriber; and
    determining, corresponding percentages of the number of subscriber groups within the relationship network that connect to the particular subscriber via each subscriber of the subset,
    wherein the determining the compensation tier is further based at least in part on a highest one of the corresponding percentages.

8. The method of claim 1, further comprising:
    determining a subset of the plurality of subscriber groups within the relationship network with direct connections to the particular subscriber; and
    determining another number of the subscribers within the subset, wherein the identifying the compensation tier is further based at least in part on the other number.

9. A computing system, comprising:
memory;
one or more processors;
one or more program modules stored on the memory and executable by the one or more processors to cause the computing system to:
  determine from correlation data that describes connections between subscribers to a telephony service, a plurality of the subscribers that are within a relationship network associated with a particular subscriber, the plurality of subscribers having direct connections to the particular subscriber or direct connections to other subscribers within the relationship network;
  determine one or more subscriber groups within the relationship network, the subscriber groups each having a predetermined number of subscribers with direct connections to common ones of the plurality of subscribers;
  determine a number of subscriber groups within the relationship network;
  determine a level of compensation to be provided to the particular subscriber, including:
    referencing of a tiered compensation scheme in which compensation tiers are based at least on numbers of subscriber groups within the relationship network;
    identification of a compensation tier for the particular subscriber based on the number of subscriber groups within the relationship network; and
  cause the particular subscriber to be provided with compensation based at least in part on the number of subscriber groups within the relationship network.

10. The computing system of claim 9, wherein:
the one or more program modules are further executable to cause the computing system to determine a subset of the subscriber groups within a personal network portion of the relationship network; and
the identification of the compensation tier is further based at least in part on another number of the subset of the subscriber groups that are within the personal network portion of the relationship network.

11. The computing system of claim 9, wherein subsets of the plurality of compensation tiers are grouped into compensation bands, and wherein the one or more program modules are further executable to cause the computing system to cause a reward to be provided to the particular subscriber based at least in part on achievement of a new compensation tier that is within a compensation band not previously achieved by the particular subscriber.

12. The computing system of claim 9, wherein the one or more program modules are further configured to cause the computing system to:
cause other compensation, in addition to the compensation, to be provided to the particular subscriber based at least in part on the determined compensation tier and purchases made by network entities within the relationship network.

13. The computing system of claim 9, wherein the one or more program modules are further executable to cause the computing system to:
determine a subset of the plurality of subscribers with direct connections to the particular subscriber, wherein identification of the compensation tier is further based at least in part on the other number being greater than or equal to a minimum number for the compensation tier.

14. The computing system of claim 9, wherein the one or more program modules are further executable to cause the computing system to:
determine a subset of the plurality of subscriber groups within the relationship network with direct connections to the particular subscriber; and
determine corresponding percentages of the number of subscriber groups within the relationship network, that connect to the particular subscriber via each subscriber of the subset, and
wherein the identification of the compensation tier is further based at least in part on a highest one of the corresponding percentages.

15. One or more computer-readable storage media comprising a plurality of instructions executable by one or more processors of a computing system to cause the computing system to:
  determine, from correlation data that describes connections between subscribers to a telephony service, a plurality of the subscribers that are within a relationship network associated with a particular subscriber, the plurality of the subscribers having direct connections to the particular subscriber or direct connections to other subscribers within the relationship network;
  determine one or more subscriber groups within the relationship network, individual ones of the subscriber groups having a predetermined number of subscribers with direct connections to common ones of the plurality of subscribers;
  determine a number of subscriber groups within the relationship network;
  determine a compensation level to be provided to the particular subscriber, including:
    a look up to a compensation table in which compensation tiers are based on at least numbers of subscriber groups within the relationship network; and
    identification of a compensation tier for the particular subscriber based on the number of subscriber groups within the relationship network; and
  cause the particular subscriber to be provided with the determined compensation level that is based at least in part on the identified compensation tier.

16. The one or more computer-readable storage media of claim 15, wherein the plurality of instructions is further executable to cause the computing system to:
determine from the relationship network another number of subscriber groups within a personal network portion of the relationship network, and
wherein the identification of the compensation tier is further based at least on the other number.

17. The one or more computer-readable storage media of claim 15, wherein the plurality of instructions is further executable to cause the computing system to determine from the relationship network a number of the subscriber groups with direct connections to the particular subscriber, wherein the identification of the compensation tier is further based at least in part on the number of subscribers with direct connections to the particular subscriber.

18. The one or more computer-readable storage media of claim 15, wherein plurality of instructions is further executable to cause the computing system to:
determine a subset of the plurality of subscriber groups within the relationship network with direct connections to the particular subscriber; and
determine corresponding percentages of the number of subscriber groups within the relationship network that connect to the particular subscriber via each subscriber of the subset, wherein the identification of the compensation tier is further based at least in part on the corresponding percentages.

19. The one or more computer-readable storage media of claim 16, wherein:
   subsets of the plurality of compensation tiers are grouped into compensation bands; and
   the plurality of instructions is further executable to cause the computing system to cause the particular subscriber to be provided with a reward, separate from the compensation level, based at least in part on achievement of a new compensation tier that is within a compensation band that was not previously achieved by the particular subscriber.

\* \* \* \* \*